(12) United States Patent
Teyeb et al.

(10) Patent No.: US 10,736,169 B2
(45) Date of Patent: Aug. 4, 2020

(54) RADIO NETWORK NODE, WIRELESS DEVICE AND METHODS PERFORMED THEREIN

(71) Applicant: TELEFONAKTIEBOLAGET LM ERICSSON (PUBL), Stockholm (SE)

(72) Inventors: Oumer Teyeb, Solna (SE); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 5 days.

(21) Appl. No.: 16/079,230

(22) PCT Filed: Jun. 14, 2018

(86) PCT No.: PCT/SE2018/050623
§ 371 (c)(1),
(2) Date: Aug. 23, 2018

(87) PCT Pub. No.: WO2018/231138
PCT Pub. Date: Dec. 20, 2018

(65) Prior Publication Data
US 2019/0387568 A1  Dec. 19, 2019

Related U.S. Application Data

(60) Provisional application No. 62/520,603, filed on Jun. 16, 2017.

(51) Int. Cl.
*H04W 76/27* (2018.01)
*H04W 76/30* (2018.01)
(Continued)

(52) U.S. Cl.
CPC ....... *H04W 76/27* (2018.02); *H04W 28/0278* (2013.01); *H04W 72/04* (2013.01); *H04W 76/30* (2018.02)

(58) Field of Classification Search
CPC . H04W 76/27; H04W 28/0278; H04W 76/30; H04W 72/04
See application file for complete search history.

(56) References Cited

U.S. PATENT DOCUMENTS 10,425,918 B2 * 9/2019 Jiang ................. H04W 72/1268
2016/0150564 A1 * 5/2016 Quan ................. H04L 61/6054
370/329
2016/0234877 A1   8/2016 Bangolae et al.

FOREIGN PATENT DOCUMENTS

EP         2925069 A1    9/2015

OTHER PUBLICATIONS

International Search Report in International Application No. PCT/SE2018/050623 dated Sep. 24, 2018.
(Continued)

*Primary Examiner* — Afshawn M Towfighi
(74) *Attorney, Agent, or Firm* — Patent Portfolio Builders PLLC

(57) ABSTRACT

It is herein e.g. disclosed a method performed by a radio network node for handling communication of a wireless device in a wireless communication network. The radio network node determines to release the wireless device from a first state, wherein the wireless device is with an active connection for communicating data, to a second state. The radio network node further transmits to the wireless device, a release message to suspend or release the wireless device from the first state to the second state, and along with the release message, an indication of one or more resources for UL transmissions for the wireless device.

26 Claims, 16 Drawing Sheets

(51) Int. Cl.
*H04W 28/02* (2009.01)
*H04W 72/04* (2009.01)

(56) References Cited

OTHER PUBLICATIONS

Written Opinion in International Application No. PCT/SE2018/050623 dated Sep. 24, 2018.
Examination Report in corresponding/related Bangladesh Application No. 157/2018/1745 dated Dec. 5, 2019.

* cited by examiner

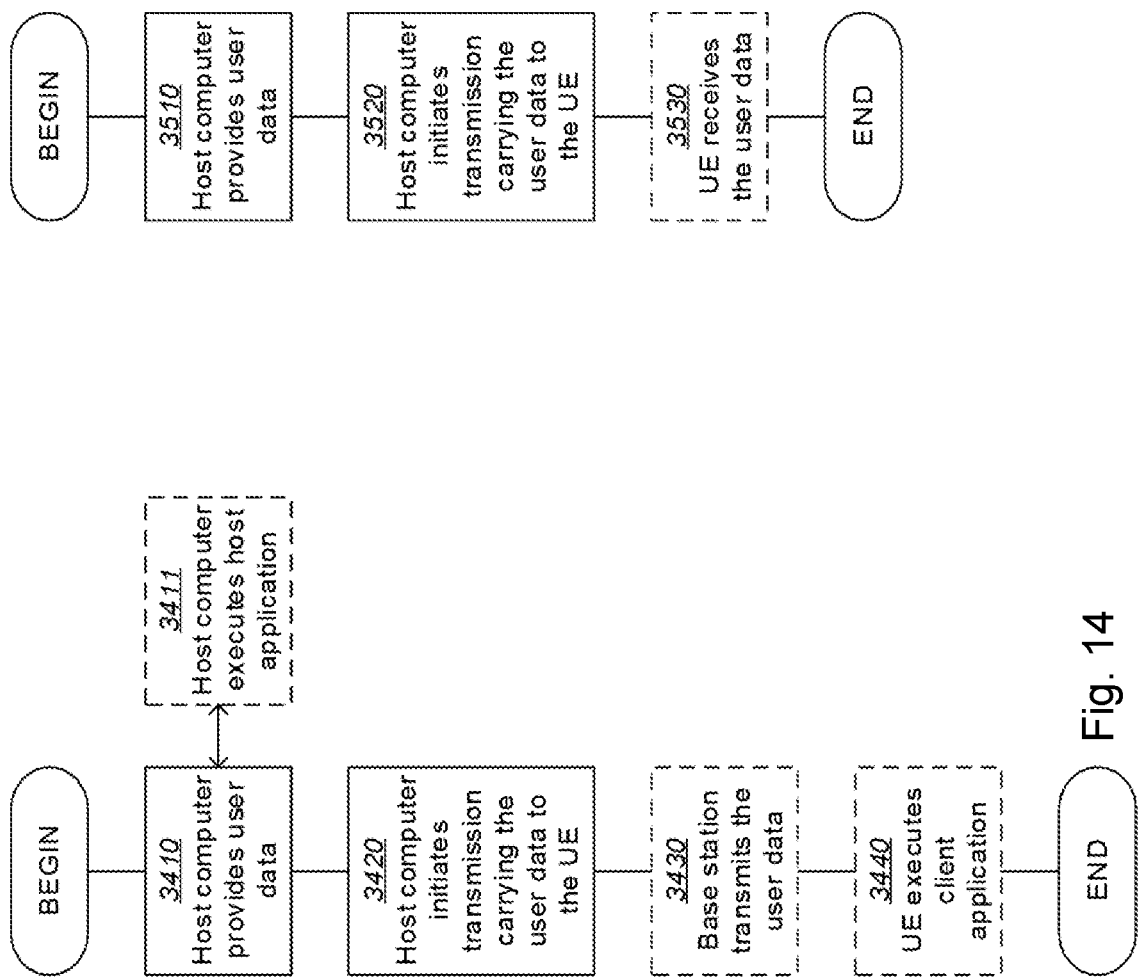

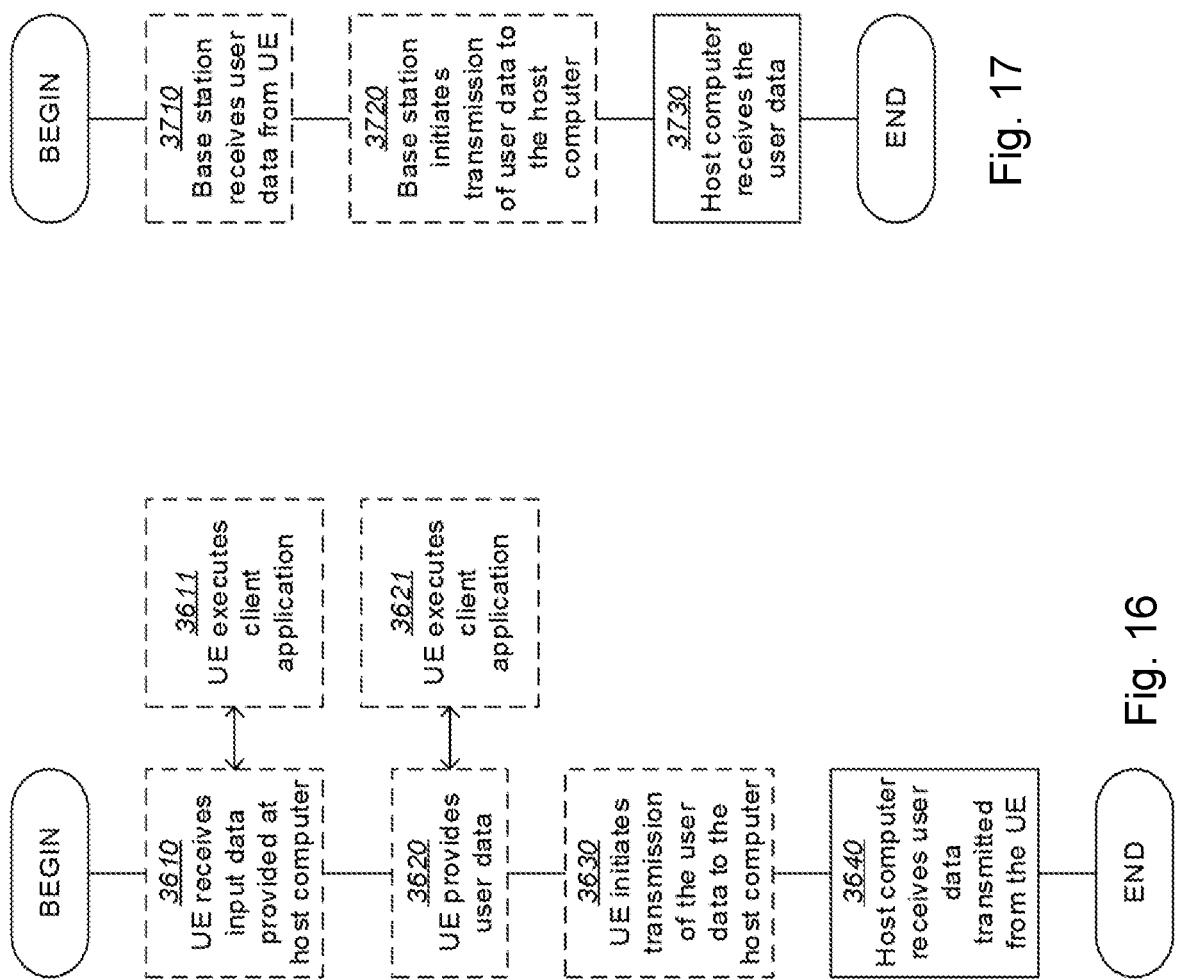

RADIO NETWORK NODE, WIRELESS DEVICE AND METHODS PERFORMED THEREIN

TECHNICAL FIELD

Embodiments herein relate to a radio network node, a wireless device and methods performed therein for communication. Furthermore, a computer program product and a computer readable storage medium are also provided herein. In particular, embodiments herein relate to enabling or handling communication of the wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

FIG. 1 illustrates S1/EPS architecture based procedures required for establishing a connection of an idle wireless device also referred to as an idle-connected mode transition, and also for tearing down the connection when the wireless device has not been active for long time which may be referred to as a connected-idle mode transition. As can be seen there is a significant signaling overhead on the radio/Uu and S1AP interfaces. Thus, FIG. 1 shows LTE connection setup and tear down.

In 3GPP, work is ongoing, both in LTE and new radio (NR) also referred to as 5G, towards supporting lightly connected wireless devices referred to as wireless devices in an inactive state or mode, which can be considered as an intermediate state between idle and connected states, where the wireless device access stratum (AS) context is kept both at the wireless device and the RAN, where the wireless device may still be seen as if it is in connected state from the CN point of view and in idle state from the RAN point of view.

An advantage of operating in this inactive state is a reduced signaling towards the CN and faster transition to the connected state as compared to idle-connected state transitions, while maintaining the wireless device power saving advantages of idle state. It should be noted that the terms "inactive", "suspended", and "lightly connected" are used interchangeably throughout this document. It is for further study (FFS) in NR whether a wireless device's inactive to connected state transitions are hidden completely from the CN, from both Control Plane (CP) and User Plane (UP) perspectives. The discussion herein is mostly on the RAN aspects and thus applicable to both cases, i.e. CN is aware of the inactive/connected state transitions or the state transitions are transparent to the CN.

In LTE, when a decision is made by the network to move the wireless device to an inactive state, the radio network node sends to the wireless device an RRCConnectionRelease message with the release cause value of rrc-suspend and it is also provided with a Resume ID. The wireless device stores the resumeIdentity and the wireless device AS context, e.g. including the current Radio Resource Control (RRC) configuration, the current security context, the Packet Data Convergence Protocol (PDCP) state including Robust Header Compression (ROHC) state, Cell Radio Network Temporary Identifier (C-RNTI) used in the source Primary Cell (PCell), the cell identity and the physical cell identity of the source PCell. The wireless device further re-establishes all Radio Link Control (RLC) entities, both for Signal Radio Bearers (SRB) and Data Radio Bearers (DRB); and suspends all DRBs and SRBs except SRB0. The RRC connection suspend procedure is illustrated in FIG. 2. The wireless device is illustrated as a UE and the radio network node is illustrated as an eNB.

1. Due to some triggers, e.g. the expiry of a UE inactivity timer, the eNB decides to suspend the RRC connection.
2. The eNB initiates the S1-AP UE Context Suspend procedure to inform a Mobility Management Entity (MME) that an RRC connection is being suspended.
3. The MME requests a Serving-Gateway (S-GW) to release all S1-U bearers for the UE.

4. MME acknowledges the UE Context Suspend request in step 2 with a UE Context Suspend response.

5. The eNB suspends the RRC connection by sending an RRCConnectionRelease message with the release-Cause set to rrc-Suspend. The message includes the resumeIdentity which is stored by the UE.

6. The UE stores the AS context, suspends all SRBs and DRBs, and UE enters RRC_idle light connected state.

When the UE later wants to resume the connection, e.g. in response to an UL data to be sent or to receive a paging request for DL data, the UE sends an RRCConnectionResumeRequest message with the saved resumeIdentity. The eNB responds with an RRCConnectionResume message, and both the UE and eNB restore the saved UE AS context, and data transmission/reception from/to the UE can be resumed. Note that the resume operation can be performed in an eNB other than the eNB that was serving the UE when the UE was suspended. In that case, the new eNB may perform a context fetch e.g. by using the Retrieve UE Context procedure from the old eNB since the resume identity includes information about the old eNB/cell.

The RRC connection resume procedure in the same eNB and new eNB are illustrated in FIG. 3 and FIG. 4, respectively.

FIG. 3 shows RRC connection resume procedure in the same eNB.

1. At some later point in time, e.g. when the UE is being paged or when new data arrives in an uplink buffer at the UE, the UE resumes the connection by sending an RRCConnectionResumeRequest to the eNB. The UE includes its resume ID, the establishment cause, and authentication token. The authentication token is calculated in the same way as the short medium access control-identity (MAC-I) used in RRC connection re-establishment and allows the eNB to verify the UE identity.

2. Provided that the Resume ID exists and the authentication token is successfully validated, the eNB responds with an RRCConnectionResume. The message includes the Next Hop Chaining Count (NCC) value which is required in order to re-establish the AS security.

3. The UE resumes all SRBs and DRBs and re-establishes the AS security. The UE is now in RRC connected state.

4. The UE responds with an RRCConnectionResume-Complete confirming that the RRC connection was resumed successfully.

5. The eNB initiates the S1-AP Context Resume procedure to notify the MME about the UE state change.

6. The MME requests the S-GW to activate the S1-U bearers for the UE.

7. MME acknowledges the S1-AP Context Resume request with a S1-AP Context Resume response.

FIG. 4 shows RRC connection resume procedure in the new eNB.

1. Same as step 1 in the intra eNB connection resumption (see FIG. 3).

2. The new eNB locates the old eNB using the Resume ID and retrieves the UE context by means of the X2-AP Retrieve UE Context procedure.

3. The old eNB responds with the UE context associated with the Resume ID.

4. Provided that the Resume ID exists and the authentication token is successfully validated, the new eNB responds with an RRCConnectionResume. The message may include the NCC value which is required in order to re-establish the AS security.

5. The UE resumes all SRBs and DRBs and re-establishes the AS security. The UE is now in RRC_connected.

6. The UE responds with an RRCConnectionResume-Complete confirming that the RRC connection was resumed successfully.

7. The new eNB initiates the S1-AP Path Switch procedure, transmitting a Path Switch request, to establish a S1 UE associated signalling connection to the serving MME and to request the MME to resume the UE context.

8. The MME requests the S-GW to activate the S1-U bearers for the UE and updates the downlink path, i.e. modifies bearers.

9. MME acknowledges the Path Switch request with a Path Switch request acknowledgement (ACK).

10. After the S1-AP Path Switch procedure the new eNB triggers release of the UE context at the old eNB by means of the X2-AP UE Context Release procedure.

A feature studied in NR that may be standardized in Rel-15 or in further releases is small UL data transmission in RRC_inactive state. Small UL data transmission in RRC_inactive state refers to a feature where a wireless device in RRC_inactive state can transmit small UL data without necessarily performing a full state transition to RRC_connected state.

If supported, the feature should be service-agnostic, catering different service requirements. The feature should work either with 4-step or 2-step Random Access Channel (RACH), it remains FFS whether and how the solution works in the case of a contention based transmission of the UL data, possibly considered if RAN1 Working Group (WG) would make such a mechanism available. For the sake of simplicity, 4-step RACH is assumed herein. FIG. 5 shows an example of a message flow for the small UL data transmission in RRC_inactive state. A high level signalling flow may work as follows:

1. A UE in RRC_inactive state sends a random access preamble such as a Physical Random Access Channel (PRACH) preamble.

2. The network responds with a Random Access Response (RAR).

3. The UE sends small UL data with message 3, it is FFS whether the message 3 is a RRCConnectionResumeRequest or a message in a Media Access Control (MAC) Control Element (CE), the message 3 may contain at least an AS context identifier (e.g. resumeID) to be used for contention resolution. This message may contain all necessary information to enable the network to move the wireless device to RRC_connected state or to enable the network to let the UE remain in RRC_inactive state. It could also provide information to enable the network to apply overload control and prioritisation, if needed. Some open issues have been identified:

a. It is FFS how the UL grant size is defined;

b. It is FFS which other information will be necessary to enable the network to move the UE to RRC_connected state or to enable the network to let the UE remain in RRC_inactive state such as Buffer Status Report (BSR);

c. It is FFS if a data threshold would be applied to trigger a separate procedure for data transmission as opposed to connection resume;

d. It is FFS whether the solution could fulfil the SA3 requirements and/or recommendation in terms of security only with the AS content identifier;

e. It is FFS which information could be provided with the message 3 to enable the network to apply overload control and prioritisation, if needed;

f. It is FFS what form of overload control/prioritisation might apply in the contention based case.

4. Triggered by message 3, the network may be able to move the wireless device to RRC_connected state via a DL RRC message 4 (e.g. RRCConnectionResume). The network should be also able to update the AS context with Message 4.

It should be noted that the wireless device may be able to send subsequent UL data transmission, at least after receiving message 4. It remains FFS whether the term "subsequent small data" covers only the case of infrequent transmissions or also frequent transmissions.

In NR there will be a transition from RRC_inactive state to RRC_connected state that will anyway be standardized and used for the case of large data. An RRC_connected wireless device may have an active AS context that is suspended when the network moves the wireless device to the RRC_inactive state. During the transition from RRC_connected state to RRC_inactive state, the wireless device may be provided with an AS context identifier, e.g. the resume ID, and the AS context is stored in a radio network node such as a gNB in NR. Using this AS context identifier, the AS context may be located and fetched to a new serving radio network node when the wireless device resumes its connection. If a solution for small data in RRC_inactive state is supported, the same wireless device AS context identifier and location mechanisms could be used as in the state transition so completely different mechanisms do not have to be defined. The solution for small data should be able to at least support an RLC Automatic Repeat Request (ARQ) mechanism, while it remains FFS how Hybrid Automatic Repeat Request (HARQ) retransmissions would be used, depending on RAN1 progress.

For some of the remaining aspects, two solutions, denoted as A and B, are considered. Within each of these solutions there are further open issues such as security aspects related to how the network makes sure the wireless device sending data is the correct wireless device, how the wireless device makes sure the network responding is the correct network, whether previously used security keys may be reused and under which scenarios. If feature is to be supported it should be a down-selection among solutions A or B, as described in 3GPP R2-1700672: "Report of 3GPP TSG RAN WG2 AdHoc on NR". In solution A, data is transmitted with some control information without any RRC signalling involved while in Solution B data is multiplexed in the MAC level with an RRC message, possibly an RRCConnectionResumeRequest.

As discussed above, the reason for the introduction of the inactive state and RRC suspend/resume procedures is to reduce signalling, especially in the CN, and also faster transitions to connected state when the connection has to be resumed due to incoming DL data or upcoming UL transmission.

A problem being addressed herein is illustrated in FIG. 6. In FIG. 6, $T_{inactivity}$ is the inactivity time for the wireless device, i.e. if $T_{inactivity}$ have elapsed since there was any UL or DL data from/to that wireless device, the network will suspend the wireless device, i.e. transit the wireless device to a different state. $T_{UL}$ refers to the time it takes for a scheduling request to be transmitted from the wireless device to the radio network node such as a gNB. $T_{DL}$ is the time it takes for an RRCConnectionRelease message to be transmitted from the radio network node to the wireless device. Tprocessing$_{UE}$ refers to the time it takes for the wireless device to process RRC messages, and Tprocessing$_{gNB}$ is the time it takes the radio network node to process the received scheduling request from the wireless device. The inactivity time of the wireless device may expire at time X.

For the scenario shown in FIG. 6, if an UL data becomes ready to be sent at the wireless device any time before A=X-$T_{UL}$-Tprocessing$_{gNB}$, for example, at the start of the dotted line in FIG. 6, then the wireless device's scheduling request would have arrived at the radio network node before the inactivity timer has expired, and as such the wireless device will not be put in inactive state. Instead, the wireless device will be provided a grant and be able to send the UL data.

If UL data becomes ready to be sent at the wireless device at any time after B=X+$T_{DL}$+Tprocessing$_{UE}$, the wireless device would have already moved to inactive state, and thus it must go through the resume process as shown in FIG. 3 before it can send the UL data.

In the case where the UL data arrives at the wireless device during the time t wherein t is A<t<B, the wireless device will still end up receiving the suspend command because the scheduling request will not reach the radio network node before the suspend command was sent out to the wireless device. Thus, the behaviour will be the same as if the UL data has arrived after time B, i.e., the wireless device must request to be resumed and be able to send the data only after the radio network node has resumed it. This behaviour is very inefficient because it will result in the wireless device going to inactive state and immediately going back to connected state again, causing unnecessary signalling as well as increasing the UL latency. This will delay the transmission of data and thus reduce or limit the performance of the wireless communication network.

SUMMARY

An object of embodiments herein is to provide a mechanism for improving performance of the wireless communication network in an efficient manner.

According to an aspect the object is achieved by providing a method performed by a radio network node for handling communication of a wireless device in a wireless communication network. The radio network node determines to release the wireless device from a first state such as a connected state, i.e. a state wherein the wireless device is with an active connection for communicating data, to a second state e.g. inactive or idle state. The radio network node transmits a release message to suspend or release the wireless device from the first state to the second state. The radio network node further transmits, along with the release message, an indication, such as an UL grant, indicating one or more resources for UL transmissions for the wireless device.

According to another aspect the object is achieved by providing a method performed by a wireless device for handling communication of the wireless device in a wireless communication network. The wireless device is in a first state, i.e. a state wherein the wireless device is with an active connection for communicating data. The wireless device receives, from a radio network node, a release message to suspend or release the wireless device from the first state. The wireless device further receives, along with the release message, an indication indicating one or more resources for UL transmissions for the wireless device. The wireless device may then use the indication to transmit UL data or perform, or initiate, a state transition to go back to the first state again.

According to yet another aspect the object is achieved by providing a radio network node for handling communication of a wireless device in a wireless communication network. The radio network node is configured to determine to release the wireless device from a first state, wherein the wireless device is with an active connection for communicating data, to a second state. The radio network node is further configured to transmit to the wireless device, a release message to suspend or release the wireless device from the first state to the second state, and along with the release message, an indication of one or more resources for UL transmissions for the wireless device.

According to still another aspect the object is achieved by providing a wireless device for handling communication in a wireless communication network. The wireless device is configured to operate in a first state wherein the wireless device is using an active connection for communicating data. The wireless device is further configured to receive from a radio network node, a release message to suspend or release the wireless device from the first state to a second state; and along with the release message, an indication indicating one or more resources for UL transmissions for the wireless device.

It is furthermore provided herein a computer program product comprising instructions, which, when executed on at least one processor, cause the at least one processor to carry out any of the methods above, as performed by the wireless device or the radio network node. It is additionally provided herein a computer-readable storage medium, having stored thereon a computer program product comprising instructions which, when executed on at least one processor, cause the at least one processor to carry out the method according to any of the methods above, as performed by the wireless device or the radio network node.

According to still another aspect the object is achieved by providing a radio network node comprising processing circuitry configured to determine to release a wireless device from a first state, wherein the wireless device is with an active connection for communicating data, to a second state. The processing circuitry is further configured to transmit to the wireless device, a release message to suspend or release the wireless device from the first state to the second state, and along with the release message, an indication of one or more resources for UL transmissions for the wireless device.

According to still another aspect the object is achieved by providing a wireless device comprising processing circuitry configured to receive from a radio network node, a release message to suspend or release the wireless device from a first state to a second state, in which first state the wireless device is configured to use an active connection for communicating data. The processing circuitry is further configured to receive along with the release message, an indication indicating one or more resources for uplink transmissions for the wireless device.

Embodiments herein enable the wireless device to transmit data, e.g. small amounts of UL data, when being ordered to transit from a first state to a second state. Thus, unnecessary state transitions from e.g. connected state to inactive/idle state and then immediately back to connected state may be avoided since data may be transmitted using the indication. This may also lead to that an overhead of signalling during the transitions may be reduced. Embodiments herein thus reduce the UL latency and/or an overall signalling load in the system and thereby leading to an improved performance of the wireless communication network.

BRIEF DESCRIPTION OF THE DRAWINGS

Embodiments will now be described in more detail in relation to the enclosed drawings, in which:

FIGS. 14-17 are flowcharts illustrating methods implemented in a communication system including a host computer, a base station and a user equipment.

DETAILED DESCRIPTION

Figure 1:
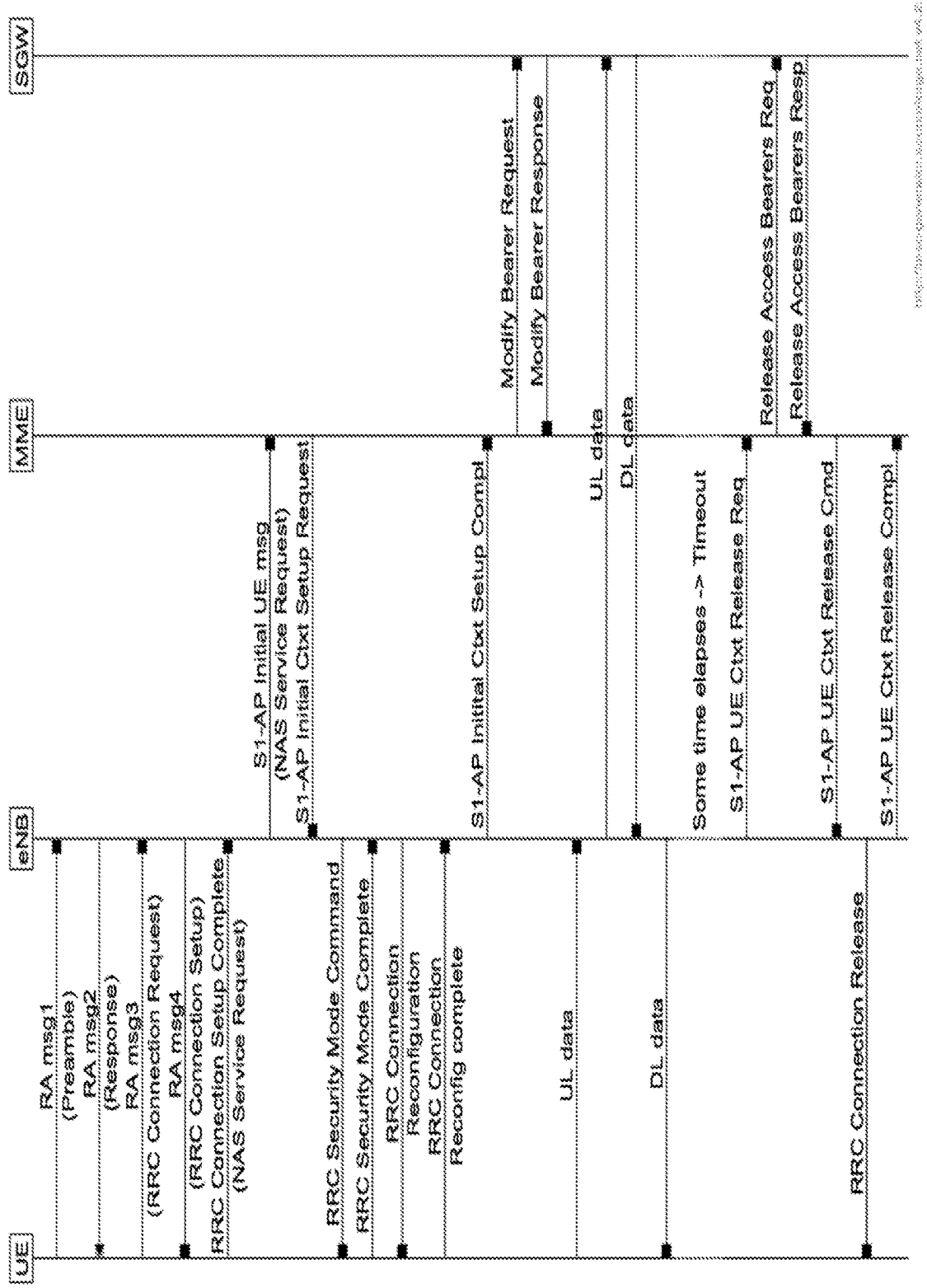
FIG. 1 shows a LTE connection setup and tear down.
Figure 2:
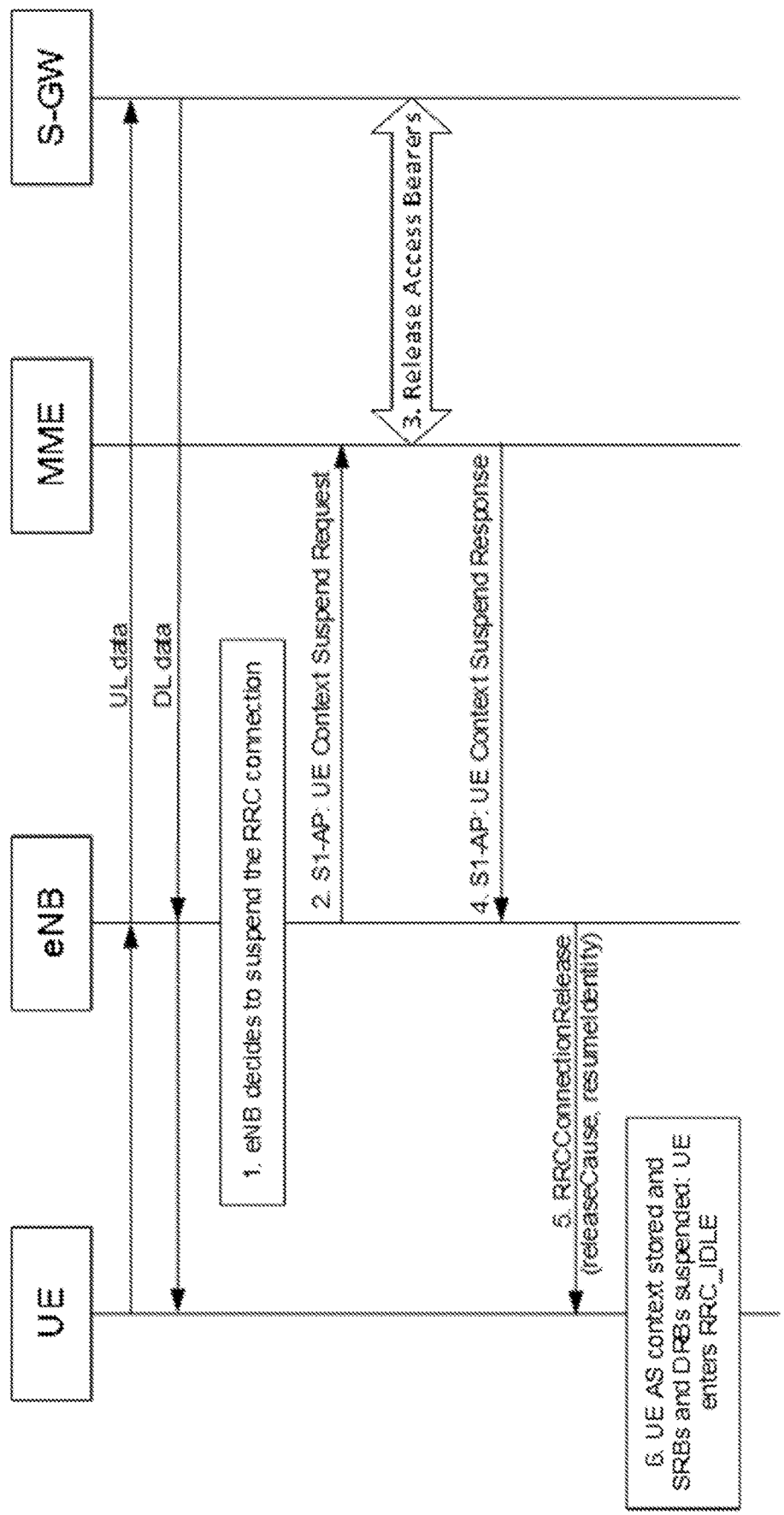
FIG. 2 shows an RRC connection suspend process.
Figure 3:
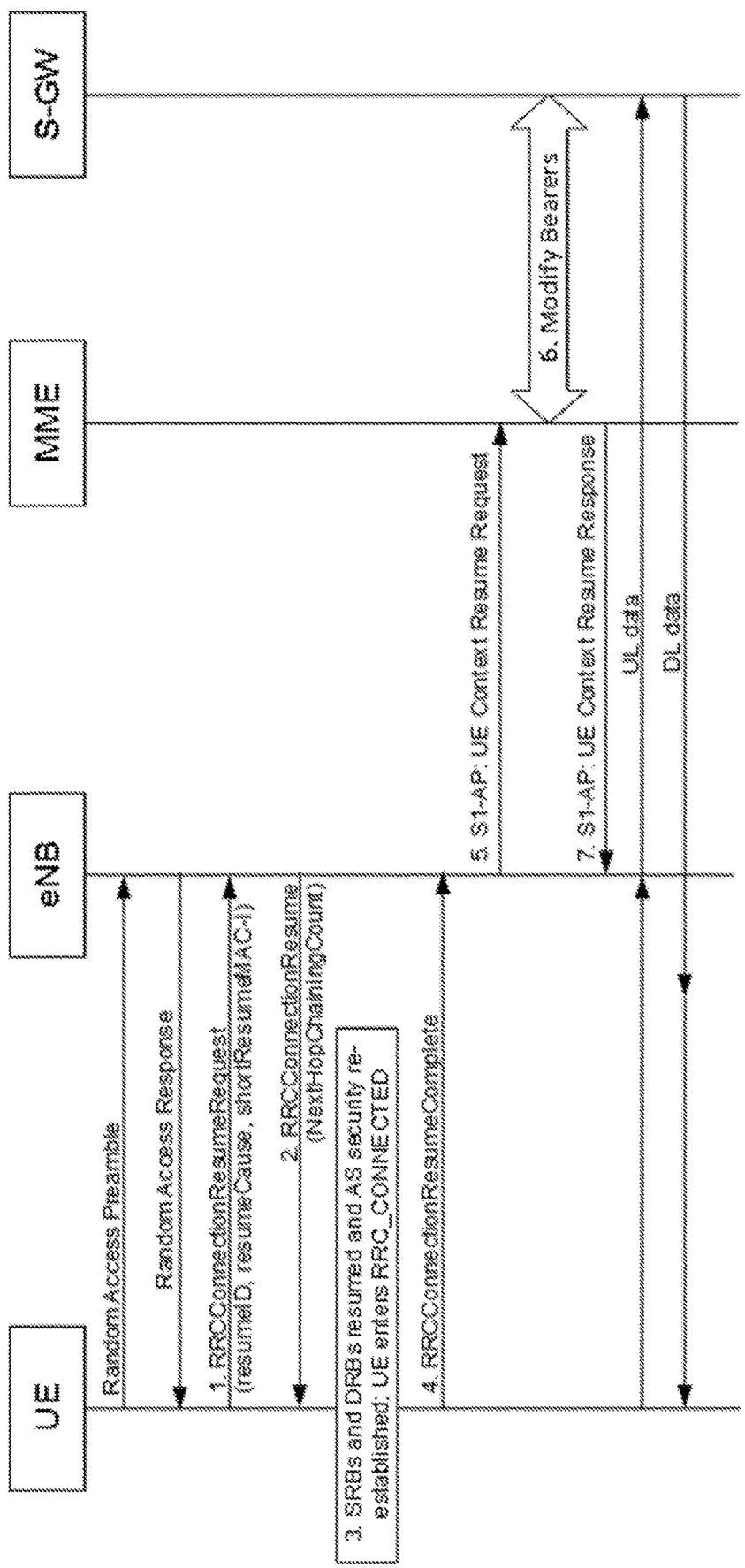
FIG. 3 shows an RRC connection resume procedure.
Figure 4:
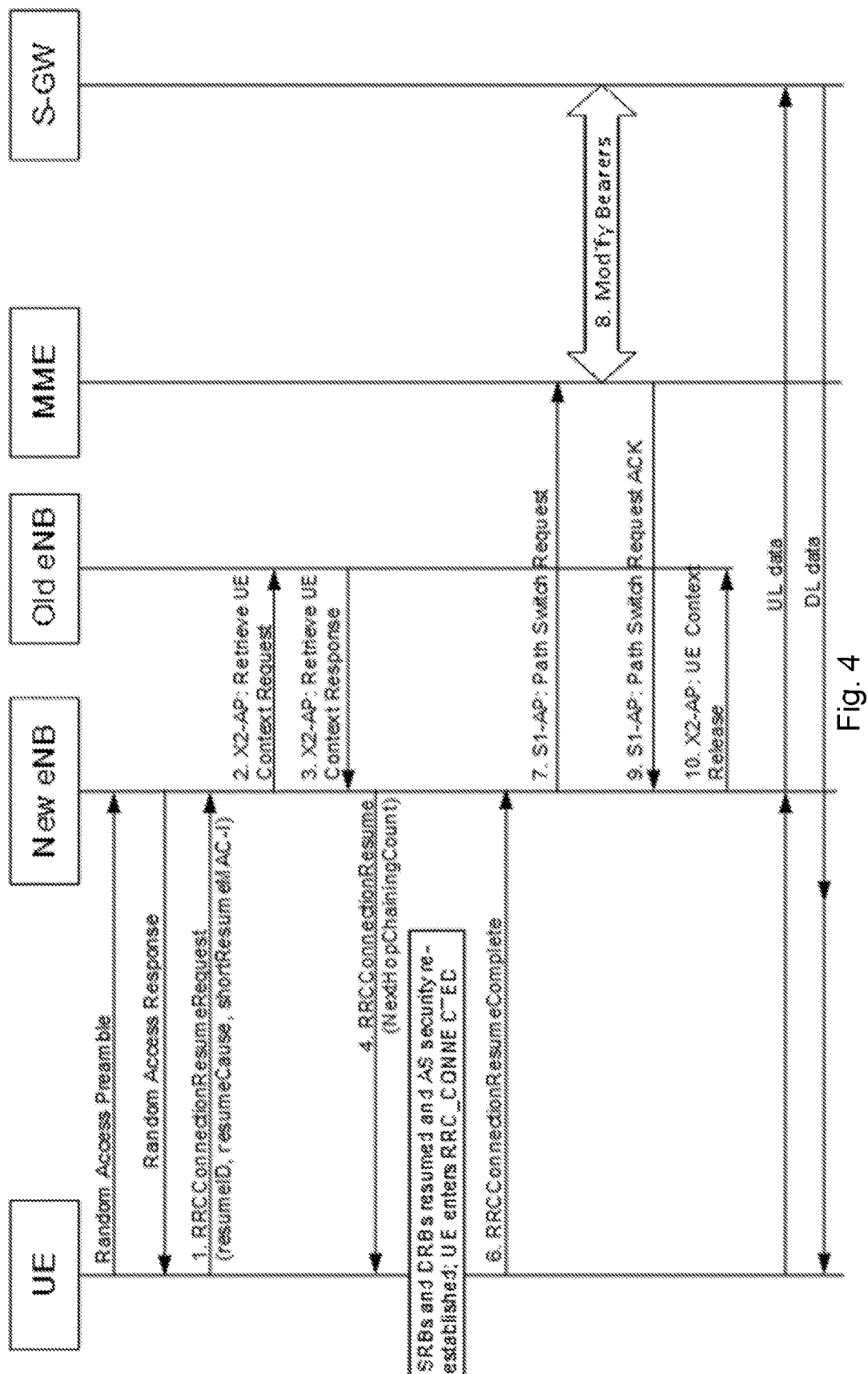
FIG. 4 shows an RRC resume procedure in an eNB different from the source eNB where the UE got suspended.
Figure 5:
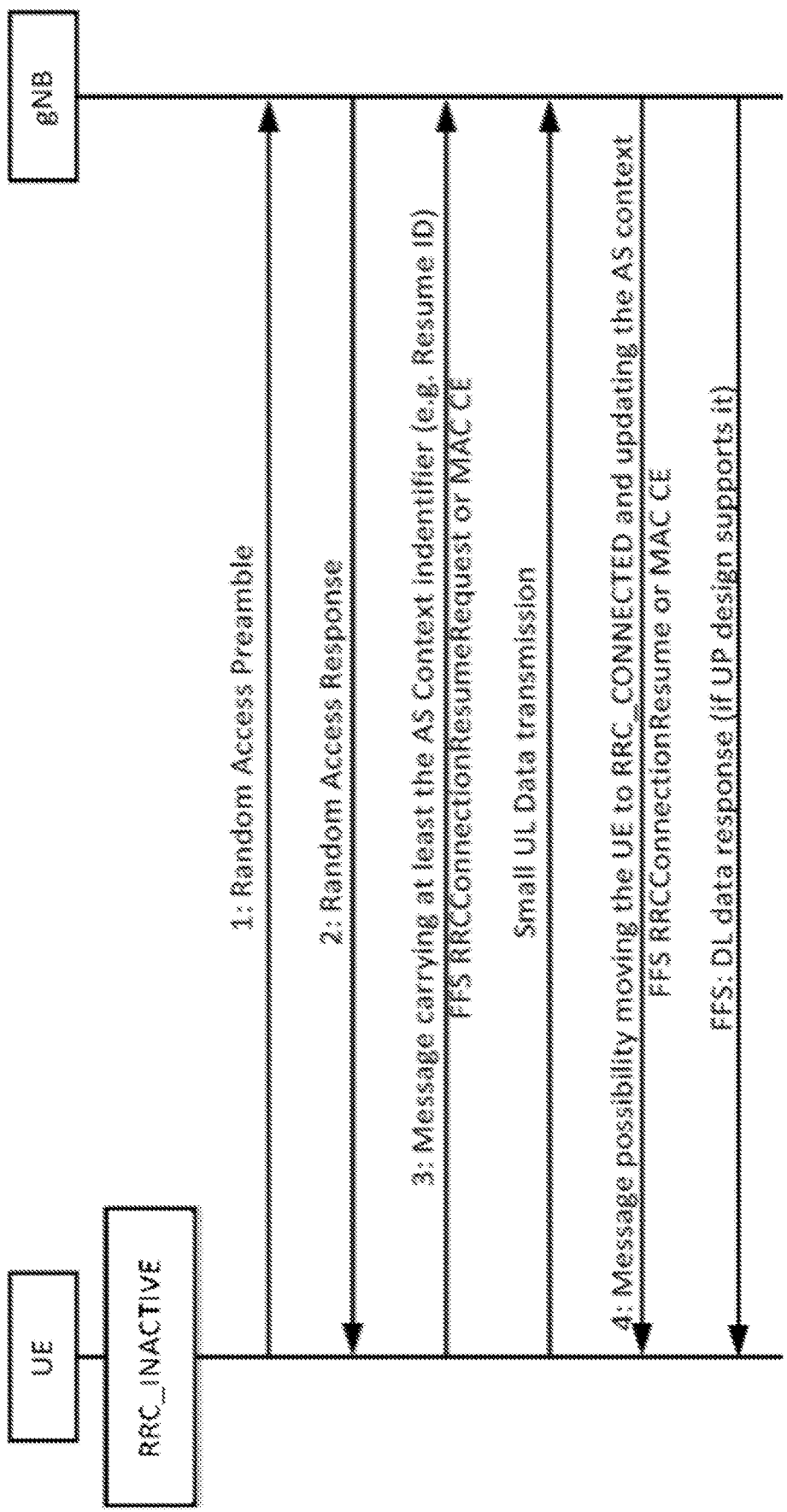
FIG. 5 shows an example of a message flow for the small UL data transmission in RRC_inactive.
Figure 6:
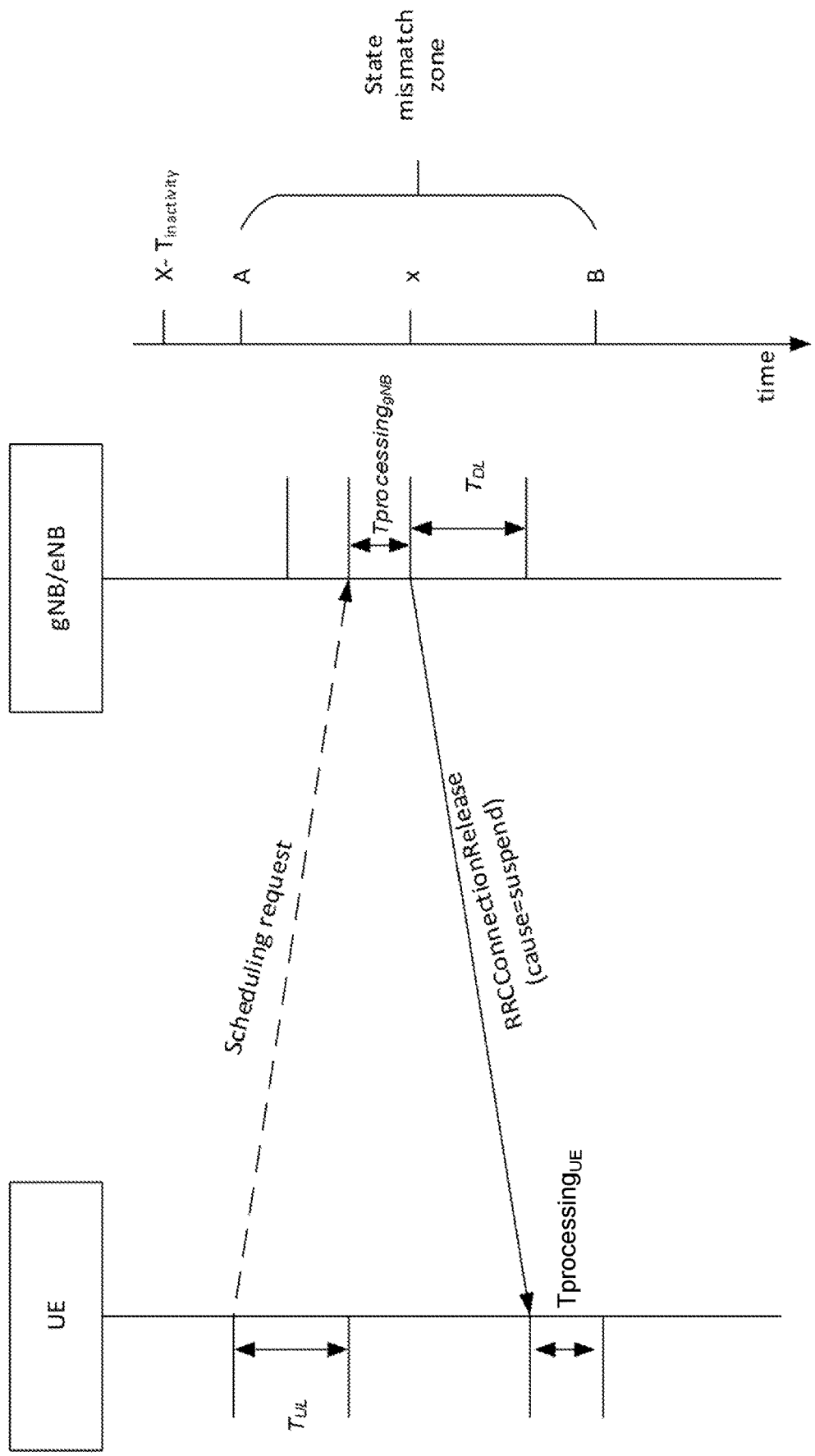
FIG. 6 shows an illustration of state mismatch problem in setting a connected UE to inactive mode.
Figure 7:
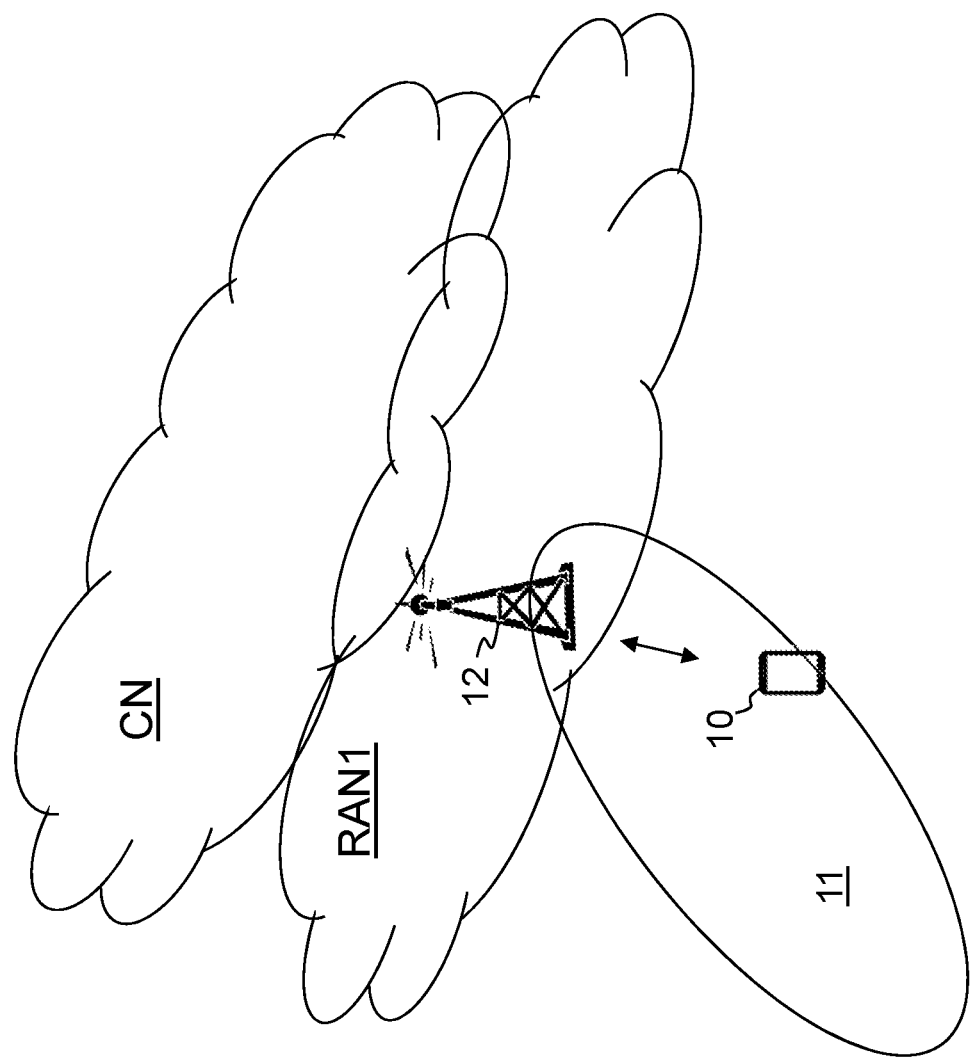
FIG. 7 is a schematic overview depicting a wireless communication network according to embodiments herein.

Embodiments herein relate to wireless communication networks in general. FIG. 7 is a schematic overview depicting a wireless communication network 1. The wireless communication network 1 comprises one or more RANs e.g. a first RAN (RAN1), connected to one or more CNs. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device 10 such as a mobile station, a non-access point (non-AP) station (STA), a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area. The wireless device searches for carriers using a carrier raster. The carrier raster indicating possible frequency positions of a carrier for the wireless device.

The wireless communication network 1 comprises a radio network node 12. The radio network node 12 is exemplified herein as a RAN node providing radio coverage over a geographical area, a first service area 11, of a radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the radio access technology and terminology used and may be denoted as a receiving radio network node. The radio network node 12 may alternatively be a core network node such as an MME or controlling network node.

It should be noted that a service area may be denoted as cell, beam, beam group or similar to define an area of radio coverage.

Embodiments herein disclose a solution to the above mentioned problem in that along with the release message to suspend or release the wireless device 10, the wireless device 10 is provided with an indication such as an UL grant and/or resources, which may be configurable. This indication or grant, also referred to as scheduling grant, may then be used to transmit UL data or at least speed up the process for the wireless device 10 to go back to e.g. connected state again.

Different use cases that are covered herein:

i) The wireless device 10 gets the indication such as the grant along with the release message and, before going to inactive state, sends any remaining UL data using the provided indication. The wireless device 10 assumes all parameters it has as it was still in connected state. The radio network node 12, when providing the indication, also assumes the wireless device 10 might still use its previously received parameters. This delays the wireless device 10 to enter the inactive state.

ii) The wireless device 10 gets the indication along with the release message and actually goes to inactive state. The indication may have a validity time so that later UL data that may come within the validity time may still use the resources of the indication. That can either be used by the wireless device 10 sending data with some control info, such as UE identifiers, etc., in inactive state or multiplexed with an RRC message.

iii) Another alternative is that the wireless device 10 gets the release message along with the indication and if there is UL data in a buffer upon receiving the release message, wireless device 10 performs like in i), if there is no UL data in buffer, wireless device performs like in ii).

By employing the mechanisms described here, unnecessary state transitions from a first state such as connected state to a second state such as inactive state and then immediately back to connected state may be prevented and/or the overhead signalling of the transitions reduced, thereby reducing the UL latency and overall signaling load in the system. The terms release procedure and transition procedure are interchangeable herein in this disclosure. The term release command may also be referred to as a release message.

Figure 8:
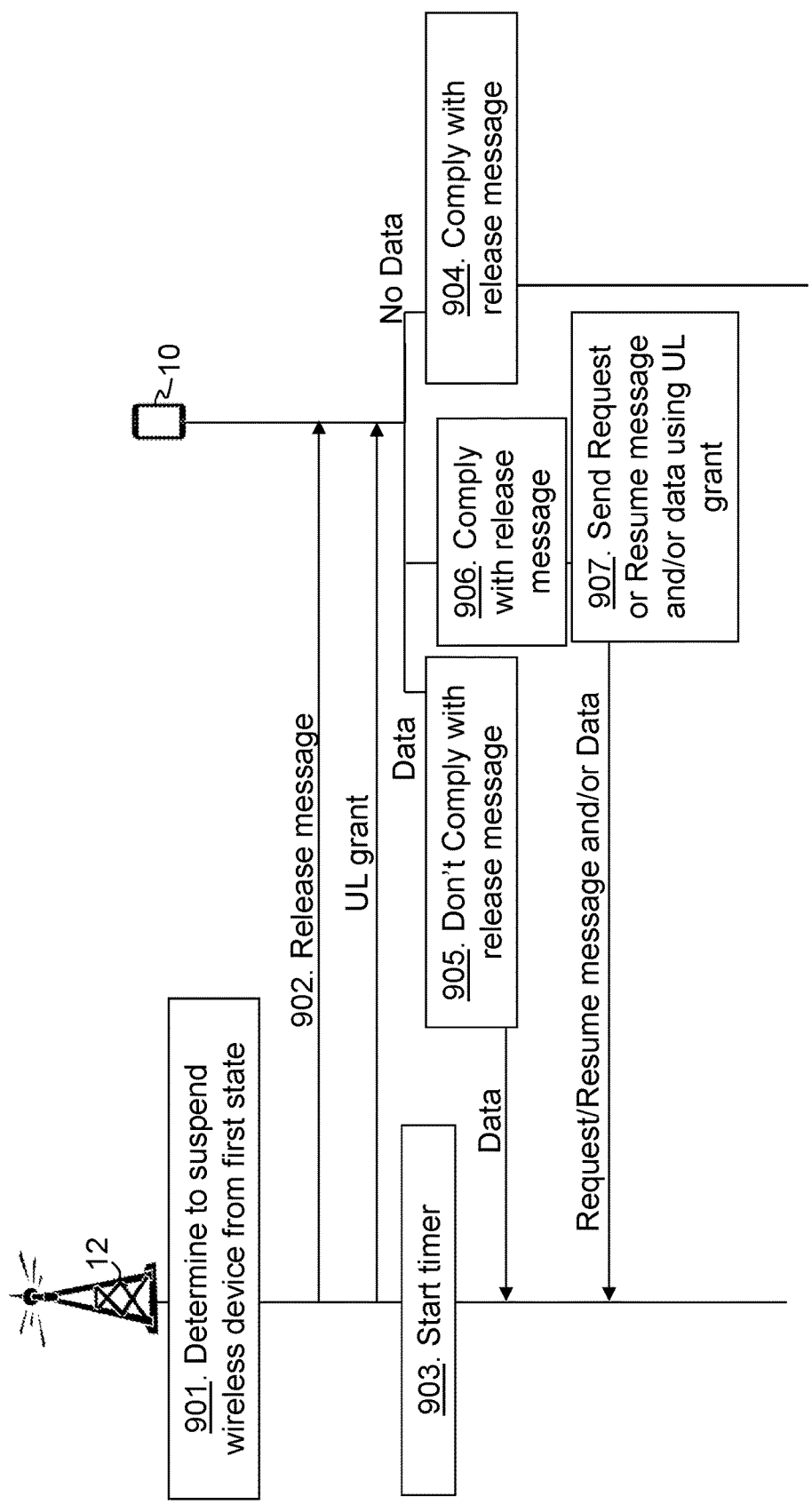
FIG. 8 is a combined signalling scheme and flowchart according to embodiments herein.

FIG. 8 is a schematic combined signaling scheme and flowchart depicting embodiments herein.

Action 901.

The radio network node 12 determines to move the wireless device 10 from a first state, such as connected state, to a second state, such as inactive state or idle state. I.e. the radio network node 12 may determine to suspend the wireless device 10 from the first state.

Action 902.

The radio network node 12 sends or transmits a release message, such as an RRCConnectionRelease message, that commands the wireless device 10 to go to idle or inactive state along with the indication such as an UL grant. The timing of transmission of the indication may be such that the indication is received at the same time or very shortly after the reception of the release message at the wireless device 10. The radio network node 12 may keep the wireless device context. The radio network node 12 may transmit the indication to the wireless device 10 only if it is not experiencing high load conditions, i.e. may transmit the indication to the wireless device 10 when load is below a load threshold. The radio network node 12 may transmit the indication to the wireless device 10 only for a sub-set of wireless devices that have been configured to receive such indications. This information indicating which wireless device is configured to receive such indications may be part of a wireless device profile, stored in the CN, and may be transferred to the radio network node 12 upon initial connection setup.

Action 903.

When the radio network node 12 sends the release message the radio network node 12 may start a timer. A time threshold value of the timer may be set based on a time that normally passes between the sending of an indication by the radio network node 12 and the reception of the UL transmission, e.g. data or request, from the wireless device 10 at the radio network node 12. When the UL transmission is received from the wireless device 10 the timer may be stopped.

If the radio network node 12 then does not receive data or a scheduling request from the wireless device 10 when the timer expires, i.e. until the time threshold is exceeded, this is an indication that there is no state mismatch. In other words, the UL transmission has not arrived before the wireless device 10 was successfully put to the second state such as inactive or idle state. The radio network node 12 may thus finalize the release procedure. If the release command was sent to put the wireless device 10 into idle state, both the wireless device's AS and non-access stratum (NAS) context will be released, i.e. the wireless device 10 will be in the idle state from both the wireless device, RAN and CN point of view. If the release command was sent to suspend the wireless device 10 from the first state, the wireless device AS context will still be kept.

If the radio network node 12 receives an UL transmission, such as UL data or the scheduling request, which was sent from the wireless device 10 before the release message was sent from the radio network node 12, before the timer expires, i.e. during a time interval set by the time threshold value, and the radio network node 12 receives the request or the resume message multiplexed with the UL data, this is an indication that the wireless device 10 has complied to the release message, and thus the radio network node 12 may perform one or more of the following:

Action 904.

When the wireless device 10 receives the release message, the wireless device 10 may comply with the release message, e.g. go to inactive state if the release cause was e.g. "rrc-suspend", otherwise go to idle state. The wireless device 10 may comply with the release message only if the provided indication was sufficient to send any pending UL data. The wireless device 10 may comply with the release message when the wireless device 10 has no UL data to send, e.g. the wireless device 10 has no UL data or the wireless device 10 was waiting for a response to a scheduling request to send older data but has not received a response yet.

Action 905.

If the wireless device 10 has UL data to send, e.g. this can be a data that the wireless device 10 has just received or for data where the wireless device 10 has already sent a scheduling request but has not received a response yet, the wireless device 10 sends the UL data using the resources that were granted to the wireless device 10 or at least part of the data that the wireless device 10 can fit in the resources of the indication. The wireless device 10 may then not act on the release message, i.e. the wireless device 10 will stay in the first state e.g. connected state. If the indication, i.e. resources of the indication, provided to the wireless device was not sufficient to send all the UL data, the wireless device 10 may include a buffer status report (BSR), indicating the remaining data, when the wireless device 10 sends the UL data.

Action 906.

Alternatively or additionally, when the wireless device 10 receives the release message, the wireless device 10 may comply with the release message. I.e. the wireless device 10 may transit from the first state to the second state.

Action 907.

If the wireless device 10 has complied to the received release message according to action 906 and has gone to the second state such as idle state, and the wireless device 10 also has UL data to send, e.g. this can be data that the wireless device 10 has just got or for one where the wireless device 10 has already sent a scheduling request but for which the wireless device 10 has not yet received a response, the wireless device 10 may send a request message, such as an RRCConnectionRequest message, to the radio network node 12 using the resources indicated by the received indication. If the wireless device 10 has complied to the received release message according to action 906 and has gone to the second state such as inactive state, and the wireless device 10 also has UL data to send, e.g. this can be data that the wireless device 10 has just got or for one where it has already sent a scheduling request but for which the wireless device 10 has not yet received a response, the wireless device 10 may send a resume message, such as an RRCConnectionresume Request message, to the radio network node 12 using the resources indicated by the received indication. The wireless device 10 may send the request message or the resume message to the radio network node 12, if the indication, i.e. the resources indicated by the indication, that was received is sufficient to also allow the sending of the UL data, or at least parts of it, at the same time, by multiplexing the request message or the resume message with the UL data or at least part of the UL data at the MAC layer. Thus, the wireless device 10 may send data and request or resume message, because the wireless device 10 has UL data and it has complied to the release message.

The radio network node 12 may then, when nothing is received from the wireless device 10 when the timer expires, finalize release procedure. For example, the wireless device's context is released if the release message was to put the wireless device 10 into idle mode, or the wireless device's context is kept if the release message was to put the wireless device into inactive mode.

When UL transmission is received from the wireless device 10 before the timer expires, but no resume message is received, and there was no buffer status report, this means that the wireless device 10 has not complied to the release message and the resources of the indication was sufficient to send the data. The radio network node 12 may then forward the received e.g. UL data to CN, and also the wireless device's context and the connection is kept.

When UL transmission is received from the wireless device 10 before the timer expires, but no resume message is received, and there was a buffer status report, this means that the wireless device 10 has not complied to the release message and resources of the indication was not sufficient to send the data. The radio network node 12 may then forward the data to CN, the wireless device's context and connection is kept, and send more resources in e.g. an additional grant to the wireless device 10.

In some embodiments the radio network node 12 receives UL data from the wireless device 10 before the timer expires, and also a connection request message, such as a resume request, is received. This means that the wireless device 10 has complied to the release message and the radio network node 12 may then:

Forward UL data to the CN, finalize release procedure e.g. the wireless device's context is released if the release message was sent to put the wireless device into idle state or the wireless device's context is kept if the release message was to put the wireless device in inactive state); or Forward UL data to the CN, and don't finalize release procedure. For example, respond to the connection request, such as the resume message, and keep the wireless device 10 connected.

Thus, in some embodiments the radio network node 12 may forward the UL data to the CN. The radio network node 12 may finalize the release procedure as described above. E.g. if the release message was sent to put the wireless device 10 into idle state, both the wireless device's AS and NAS context may be released, i.e. the wireless device 10 will be in the idle state from both the wireless device, RAN and CN point of view. If the release message was sent to suspend the wireless device 10 i.e. into inactive state, the wireless device's AS context may still be kept, i.e. the wireless device 10 will be in inactive state from the wireless device's and RAN's point of view, and connected state from the CN point of view. The radio network node 12 may further send a rejection message such as an RRCConnectionReject message to the wireless device 10 to keep the wireless device 10 in the inactive/idle state.

The radio network node 12 may, in some embodiments, keep the wireless device 10 in the first state such as connected state. If the received message from the wireless device 10 was the request message, the radio network node 12 may continue the connection setup by sending a setup message such as RRCConnectionSetup command to the wireless device 10. If the received message from the wireless device 10 was the resume message, the radio network node 12 may continue the resume process by sending a resume message or command message such as RRCConnectionResume command to the wireless device 10.

If the radio network node 12 receives UL data or scheduling request from the wireless device 10 before the timer expires, and there was no Request or Resume message multiplexed with the UL data, this is an indication that the wireless device 10 has not complied to the release message, and thus the radio network node 12 may forward e.g. the UL data to the CN, see action 905.

The radio network node 12 may stop the release procedure, i.e. the wireless device's state will remain in connected state, both at the wireless device and the radio network node and/or the CN.

The radio network node 12 may, if a buffer status report was not received from the wireless device 10, which BSR indicates that all UL data was received, the radio network node 12 may restart the timer for the wireless device 10 also denoted as the inactivity timer.

The radio network node 12 may, if the buffer status report was received from the wireless device 10, which BSR indicates that the wireless device 10 was not able to send all the UL data in the resources of the provided indication, the radio network node 12 may then additionally grant the wireless device 10 with the necessary resources.

Figure 9A:
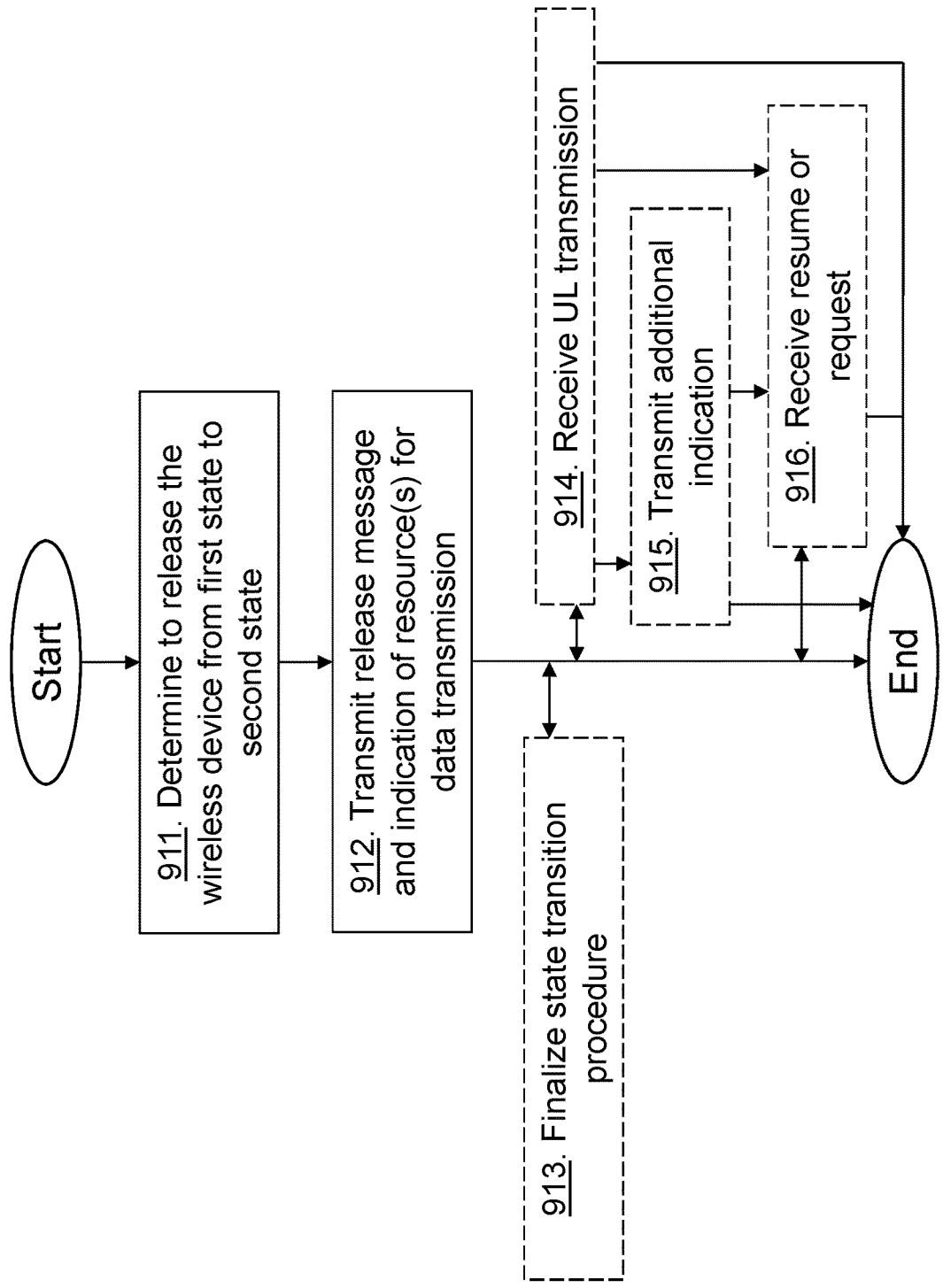
FIG. 9a is a flowchart depicting a method performed by a radio network node according to embodiments herein.

The method actions performed by the radio network node 12 for handling communication of the wireless device 10 in the wireless communication network 1 according to embodiments herein will now be described with reference to a flowchart depicted in FIG. 9a. The actions do not have to be taken in the order stated below, but may be taken in any suitable order. Actions performed in some embodiments are marked with dashed boxes.

Action 911.

The radio network node 12 determines to release the wireless device 10 from the first state, wherein the wireless device 10 is with an active connection for communicating data, i.e. the first state is a connected state, to the second state, e.g. the inactive state or the idle state.

Action 912.

The radio network node 12 transmits to the wireless device 10, the release message to suspend or release the wireless device 10 from the first state, and along with the release message, the indication of one or more resources for UL transmissions, such as transmission of UL data or scheduling request, for the wireless device 10. The indication may be an uplink grant and may comprise a validity time. Thus, a condition may be fulfilled before using the UL grant e.g. the validity time is still running. Another condition is that the wireless device 10 is within a same cell or within a list of configurable cells (or area). Thus, the identity of an allowed cell may be transmitted in association with the UL grant.

Action 913.

The radio network node 12 may, when no UL data is received from the wireless device 10 within a time interval from the transmission of the release message, finalize a state transition procedure for the wireless device 10.

Action 914.

The radio network node 12 may receive the uplink transmission from the wireless device 10 over the one or more resources.

Action 915.

The radio network node 12 may, when a buffer status report is received within the time interval from transmitting the release message, transmit an additional indication, such as an additional UL grant, indicating further one or more resources for UL transmissions, based on the buffer status report.

Action 916.

The radio network node may receive from the wireless device 10 a request message or a resume message to indicate a state transition for the wireless device 10 to go back to the first state.

Figure 9B:
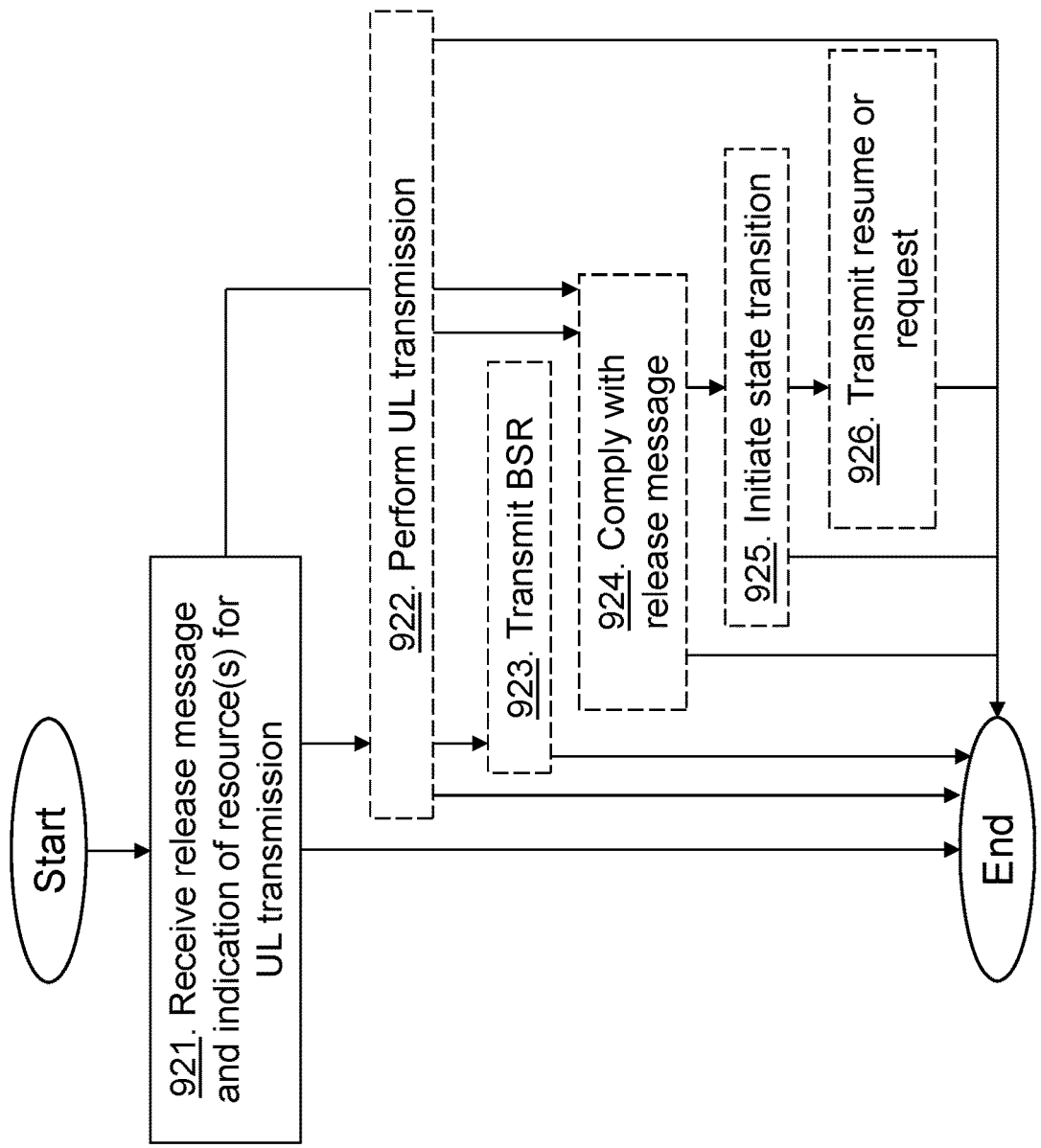
FIG. 9b is a flowchart depicting a method performed by a wireless device according to embodiments herein.

The method actions performed by the wireless device for handling communication of the wireless device 10 in the wireless communication network 1 according to embodiments herein will now be described with reference to a flowchart depicted in FIG. 9b. The wireless device 10 is in the first state wherein the wireless device 10 is using an active connection for communicating data. The actions do not have to be taken in the order stated below, but may be taken in any suitable order. Actions performed in some embodiments are marked with dashed boxes.

Action 921.

The wireless device 10 receives from the radio network node 12, the release message to suspend or release the wireless device 10 from the first state to the second state; and along with the release message, the indication indicating one or more resources for UL transmissions for the wireless device. The indication may be an uplink grant and may comprise the validity time. The first state may be the connected state and the second state may be the inactive state or idle state.

Action 922.

The wireless device 10 may perform an uplink transmission taking the received indication into account e.g. use the indicated one or more resources to transmit uplink data. E.g. the wireless device 10 may having data to send use the one or more resources indicted in the indication. The indication may be valid for the validity time and the wireless device 10 may transmit data received during this validity time.

Action 923.

The wireless device 10 may, when having more data to transmit than indicated by the indication, transmit, to the radio network node 12, the buffer status report of the more data.

Action 924.

The wireless device 10 may comply with the release message and transit to the second state.

Action 925.

The wireless device 10 may initiate state transition to go back to the first state, e.g. in case the wireless device has data to transmit.

Action 926.

The wireless device 10 may transmit, to the radio network node 12, the resume message or the request message to indicate the state transition to go back to the first state It should be noted that the disclosure focuses only on cases where the network can suspend the wireless device 10 with one message, i.e. no complete/confirm message needed from the wireless device 10. However, embodiments herein are equally applicable in a two-step procedure instead, e.g. something similar to RRCConnectionReconfiguration and RRCConnectionReconfigurationComplete. The state mismatch problem in this case may be less of a problem because, if the wireless device 10 has data to send, it can multiplex the UL data with the complete/confirm message.

It should be noted that:
- Though focus of the disclosure is on the inactive state, the situation is similar when moving the wireless device 10 from connected state to idle state as well.
- Focus of the disclosure is further on the NR case (hence using the term gNB for the base station instead of eNB). However, the mechanisms are applicable to LTE or any cellular network where there is a similar support for transitions between connected and idle states, or connected and inactive states
- UL grant may be sent to the wireless device 10 via Physical Downlink Control Channel (PDCCH), while the release command is sent via Physical Downlink Shared Channel (PDSCH). Thus, when referring to "UL grant sent along with the release message", it shouldn't be interpreted as the grant is specified within the release command and sent via PDSCH, but rather that the network ensures that at the same Transmission Time Interval (TTI) the wireless device 10 gets the release command, or shortly after that, the proper Downlink Control Information (DCI) for the UL grant for that wireless device 10 is also indicated in the PDCCH. It is herein referred to the RRC message for sending the wireless device 10 into inactive/idle mode as RRCConnectionRelease, adopting the same terminology as in LTE. However, the message could take another name in e.g. NR (e.g. RRCConnectionInactivation or RRCConnectionDeactivation, etc.).

The message sent from the wireless device 10 to establish connection (i.e. switch from idle mode to connected state) is referred to as RRCConnectionRequest as in LTE. However, the message could take another name in e.g. NR such as RRCConnectionReconfigurationRequest.

The message sent from the wireless device 10 to switch from inactive state to connected state is referred to as RRCConnectionResumeRequest as in LTE. However, the message could take another name in e.g. NR such as RRCConnectionActivationRequest.

Furthermore, the wireless device 10 may send UL data without necessary multiplexing the UL data with an RRC message. The UL grant may be used for data or for data+ control info (e.g. UE identifier, etc.). The control info may be an RRC message. The wireless device may thus before entering inactive state or idle state perform some L1 process e.g. beam tracking, and may be released after sending that data. Hence, the embodiments herein delays the transition to inactive/idle state if there is UL data in a buffer of the wireless device and an UL grant has been received in association with the release message.

Figure 10:
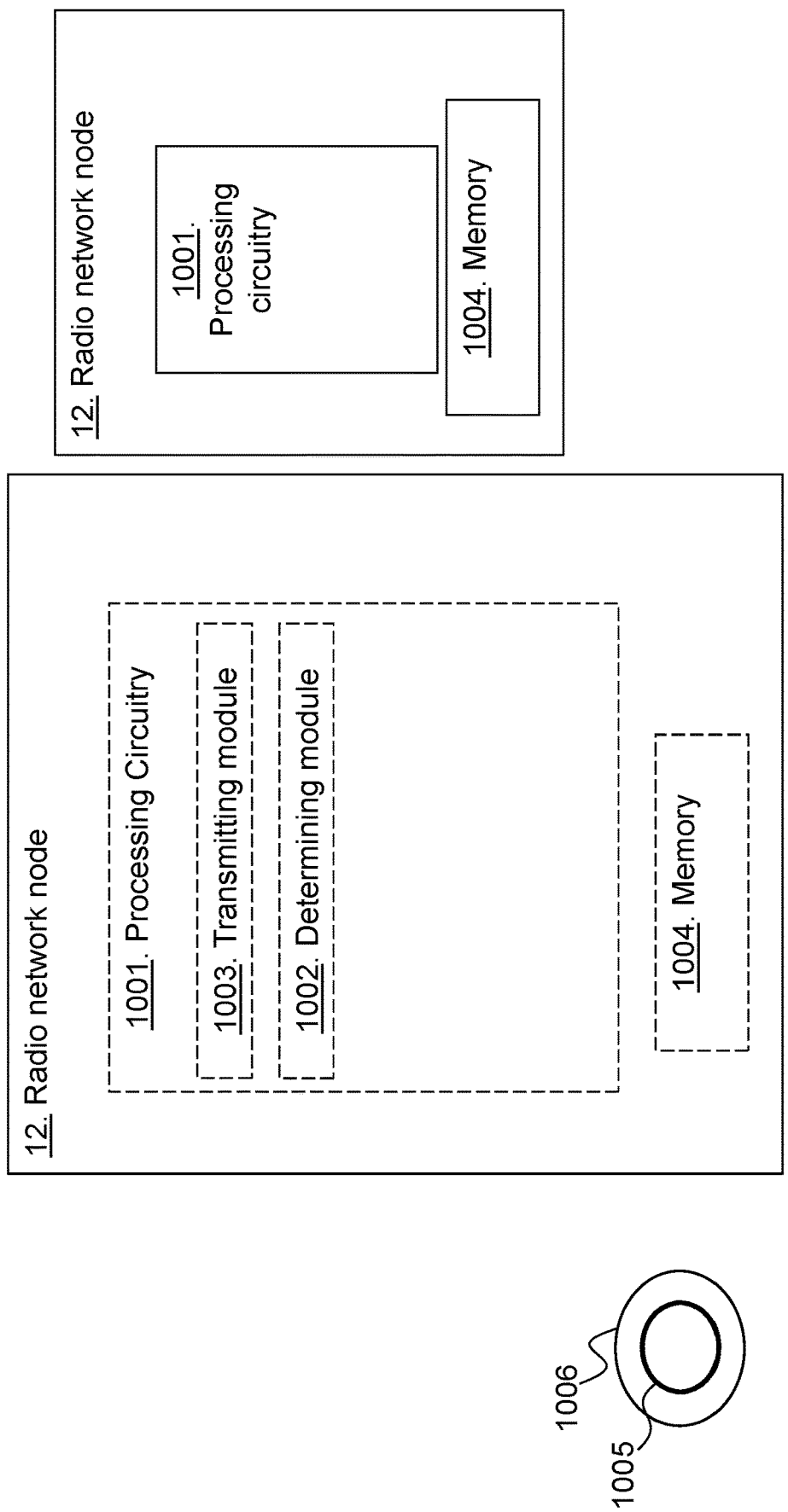
FIG. 10 is a block diagram depicting a radio network node according to embodiments herein.

FIG. 10 is a block diagram depicting the radio network node 12 for handling communication for the wireless device 10 in the wireless communication network 1 according to embodiments herein.

The radio network node 12 such as a radio base station may comprise processing circuitry 1001, e.g. one or more processors, configured to perform the methods herein.

The radio network node 12 may comprise a determining module 1002. The radio network node 12, the processing circuitry 1001 and/or the determining module 1002 is configured to determine to release the wireless device from a first state, i.e. a state wherein the wireless device is with an active connection for communicating data to a second state.

The radio network node 12 may comprise a transmitting module 1003, e.g. a transmitter or a transceiver. The radio network node 12, the processing circuitry 1001 and/or the transmitting module 1003 is configured to transmit to the wireless device 10, the release message to suspend or release the wireless device from the first state to the second state. The first state may be a connected state and the second state may be an inactive state or an idle state. The radio network node 12, the processing circuitry 1001 and/or the transmitting module 1003 is further configured to transmit, along with the release message, the indication of one or more resources for uplink transmissions for the wireless device 10, e.g. an UL grant, indicating resources for UL transmissions. The indication may further comprise the validity time, i.e. a time for which the UL grant is valid.

The radio network node 12, the processing circuitry 1001 and/or the determining module 1002 may be configured to, when no data is received from the wireless device from the transmission of the release message within a time interval, finalize a state transition procedure for the wireless device 10.

The radio network node 12, the processing circuitry 1001 and/or the determining module 1002 may be configured to receive the uplink transmission from the wireless device 10 over the one or more resources.

The radio network node 12, the processing circuitry 1001 and/or the transmitting module 1003 may be configured to, when the buffer status report is received within the time interval from transmitting the release message, transmit an additional indication, wherein the additional indication indicates further one or more resources for uplink transmissions for the wireless device 10 based on the buffer status report.

The radio network node 12, the processing circuitry 1001 and/or the determining module 1002 may be configured to receive from the wireless device 10, the resume message or the request message to indicate a state transition for the wireless device 10 to go back to the first state.

The radio network node 12 further comprises a memory 1004. The memory comprises one or more units to be used to store data on, such as UL grants, data, state information, buffer information, applications to perform the methods disclosed herein when being executed, and similar. Thus, the radio network node 12 may comprise the processing circuitry and the memory, said memory comprising instructions executable by said processing circuitry whereby said radio network node is operative to perform the methods herein.

The methods according to the embodiments described herein for the radio network node 12 are respectively implemented by means of e.g. a computer program product 1005 or a computer program, comprising instructions, i.e., software code portions, which, when executed on at least one processor, cause the at least one processor to carry out the actions described herein, as performed by the radio network node 12. The computer program product 1005 may be stored on a computer-readable storage medium 1006, e.g. a universal serial bus (USB) stick, disc or similar. The computer-readable storage medium 1006, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

Figure 11:
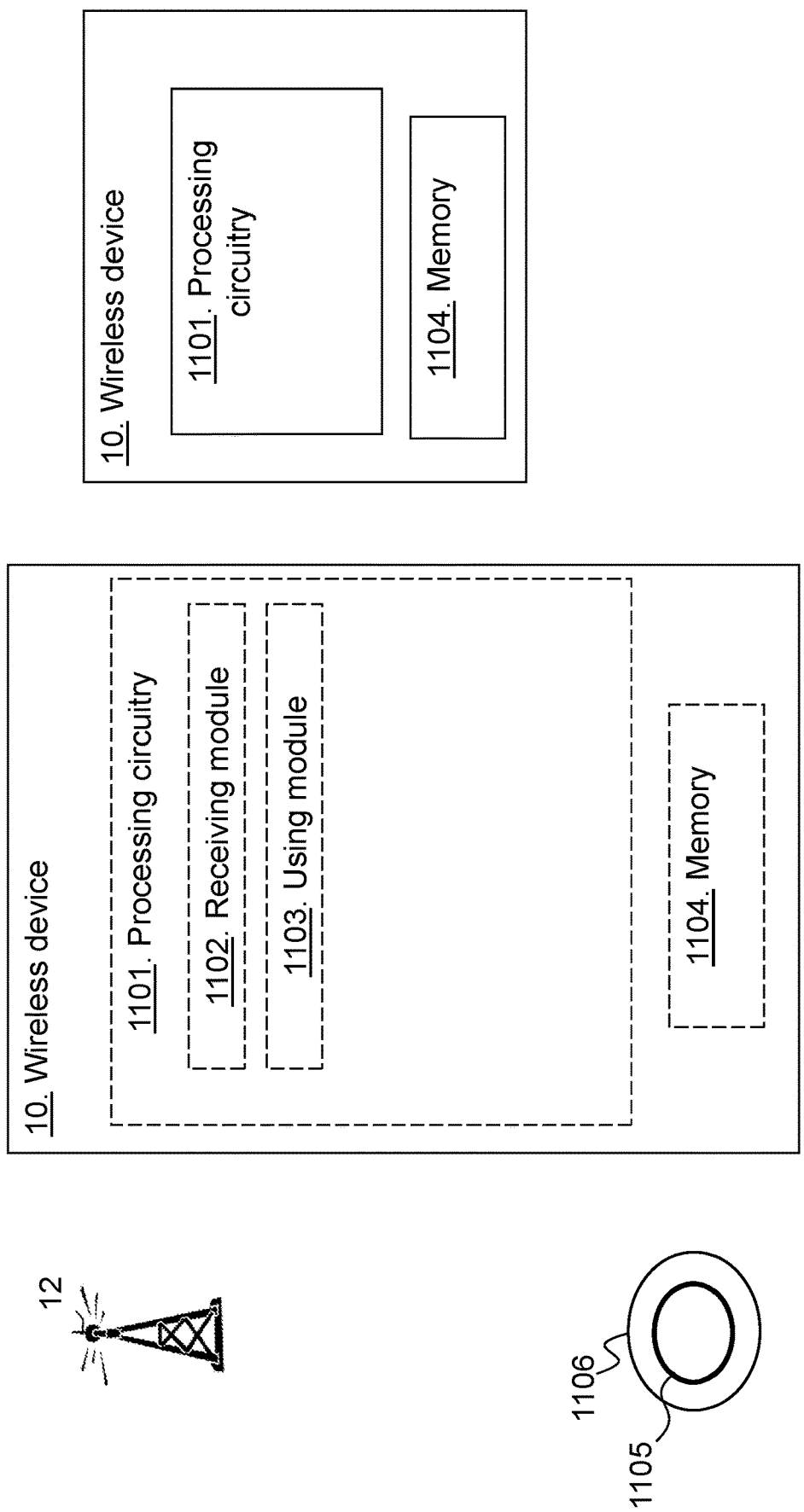
FIG. 11 is a block diagram depicting a wireless device according to embodiments herein.

FIG. 11 is a block diagram depicting the wireless device 10 for handling communication of the wireless device 10 in the wireless communication network 1 according to embodiments herein. The wireless device 10 is configured to operate in a first state wherein the wireless device 10 is using an active connection for communicating data.

The wireless device 10 such as a radio base station may comprise processing circuitry 1101, e.g. one or more processors, configured to perform the methods herein.

The wireless device 10 may comprise a receiving module 1102, e.g. a receiver or transceiver. The wireless device 10, the processing circuitry 1101 and/or the receiving module 1102 is configured to receive from a radio network node 12, the release message to suspend or release the wireless device 10 from the first state to the second state. The radio network node 12, the processing circuitry 1101 and/or the receiving module 1102 is further configured to receive, along with the release message, an indication indicating one or more resources for uplink transmissions for the wireless device 10 e.g. the UL grant. The indication may be an uplink grant and may comprise a validity time. The first state may be the connected state and the second state may be the inactive state or the idle state.

The wireless device 10 may comprise a using module 1103. The wireless device 10, the processing circuitry 1101 and/or the using module 1103 may be configured to perform the uplink transmission taking the received indication into account. For example, the wireless device 10, the processing circuitry 1101 and/or the using module 1103 may be configured to use the received UL grant to transmit UL data, or to use the received UL grant to perform or initiate the state transition to go back to the first state again. The wireless device 10, the processing circuitry 1101 and/or the using module 1103 may be configured to, when having more data to transmit than indicated by the indication, transmit to the radio network node 12, the buffer status report of the more data.

The wireless device 10, the processing circuitry 1101 and/or the using module 1103 may be configured to comply with the release message and transit to the second state. The wireless device 10, the processing circuitry 1101 and/or the using module 1103 may be configured to initiate a state transition to go back to the first state. The wireless device 10, the processing circuitry 1101 and/or the using module 1103 may be configured to transmit, to the radio network node 12, the resume message or the request message to indicate the state transition to go back to the first state.

The wireless device 10 further comprises a memory 1104. The memory comprises one or more units to be used to store data on, such as UL grants, data, state information, buffer information, applications to perform the methods disclosed herein when being executed, and similar. Thus, the wireless device 10 may comprise the processing circuitry and the memory, said memory comprising instructions executable by said processing circuitry whereby said wireless device 10 is operative to perform the methods herein.

The methods according to the embodiments described herein for the wireless device 10 are respectively implemented by means of e.g. a computer program product 1105 or a computer program, comprising instructions, i.e., software code portions, which, when executed on at least one processor, cause the at least one processor to carry out the actions described herein, as performed by the wireless device 10. The computer program product 1105 may be stored on a computer-readable storage medium 1106, e.g. a disc, a USB stick or similar. The computer-readable storage medium 1106, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 12:
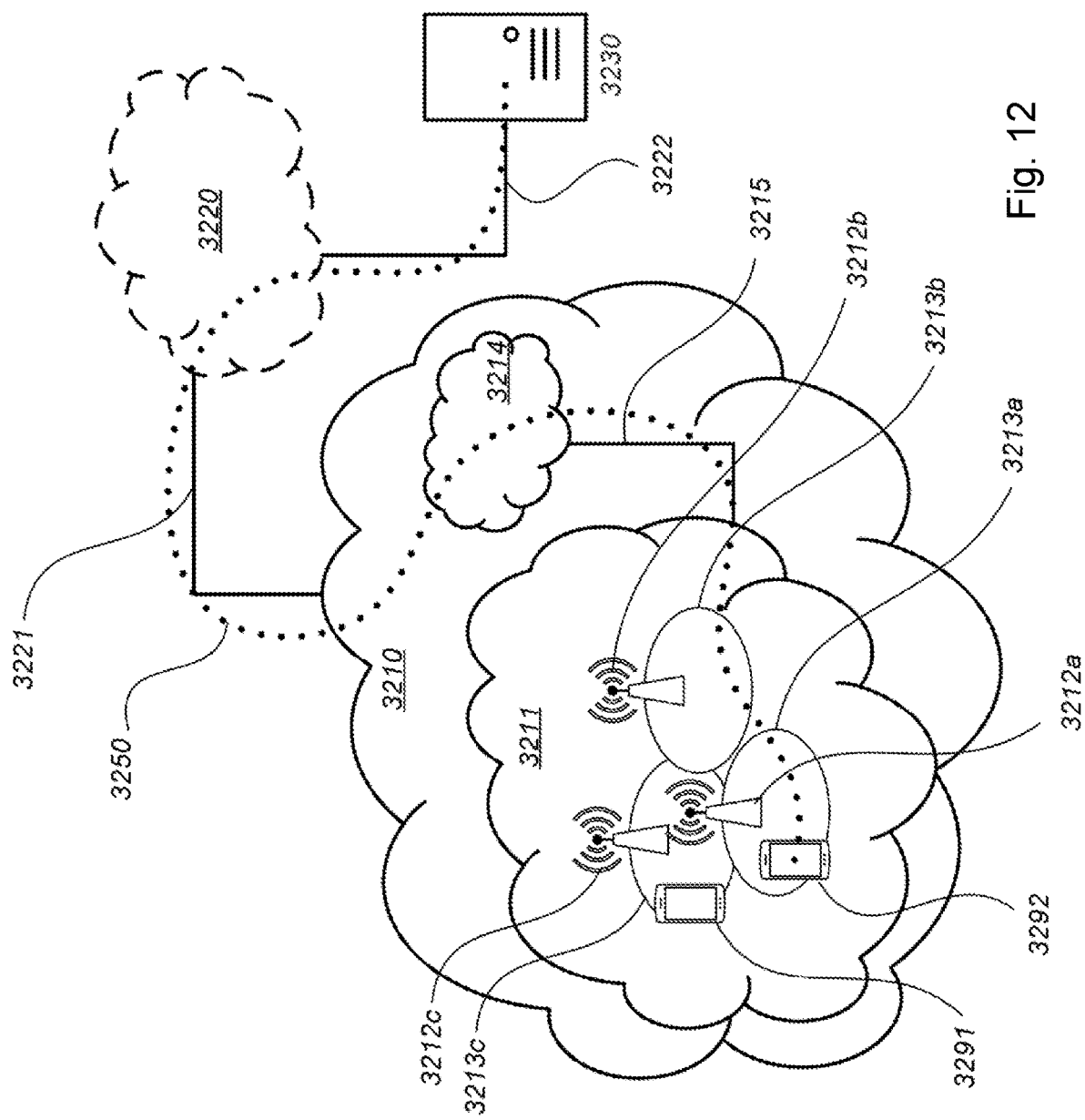
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
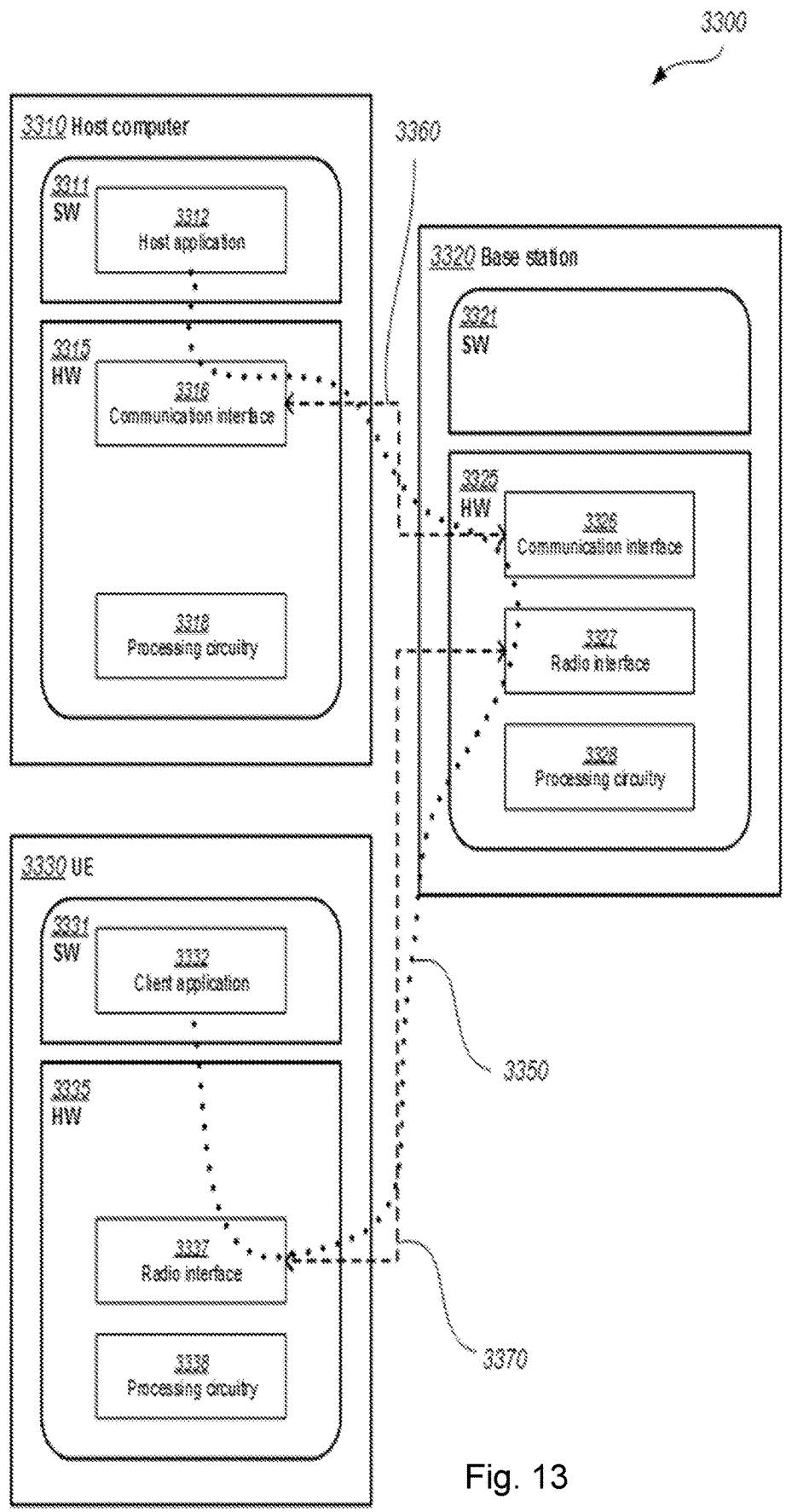
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve transmissions as number of transitions between states may be reduced and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a wireless communication network, wherein the wireless device is in a first state wherein the wireless device is using an active connection for communicating data, the method comprising:
receiving from a radio network node, a release message to suspend or release the wireless device from the first state to a second state; and along with the release message, an indication indicating one or more resources for uplink transmissions for the wireless device; and then
performing an uplink transmission, while the wireless device is in the first state, taking the received indication into account,
wherein the first state is a connected state and the second state is an inactive state or an idle state,
wherein the inactive state is an intermediate state between the connected state and the idle state, wherein when the wireless device is in the inactive state, the wireless device access stratum (AS) context is kept both at the wireless device and the radio network node.

2. The method according to claim 1, wherein the indication is an uplink grant and comprises a validity time.

3. The method according to claim 1, further comprising, when having more data to transmit than indicated by the indication, transmitting, to the radio network node, a buffer status report of the more data.

4. The method according to claim 1, further comprising complying with the release message and transit to the second state.

5. The method according to claim 4, further comprising initiating a state transition to go back to the first state.

6. The method according to claim 5, further comprising transmitting, to the radio network node, a resume message or a request message to indicate the state transition to go back to the first state.

7. A computer program product device comprising instructions, which, when executed on at least one processor, cause the at least one processor to carry the method according to claim 1, as performed by the wireless device or the radio network node.

8. A non-transitory computer-readable storage medium, having stored thereon a computer program product comprising instructions which, when executed on at least one processor, cause the at least one processor to carry out the method according to claim 1, as performed by the wireless device or the radio network node.

9. A method performed by a radio network node for handling communication of a wireless device in a wireless communication network, comprising:
determining to release the wireless device from a first state, wherein the wireless device is with an active connection for communicating data, to a second state;

transmitting to the wireless device, a release message to suspend or release the wireless device from the first state to the second state, and along with the release message, an indication indicating one or more resources for uplink transmissions for the wireless device; and then receiving an uplink transmission from the wireless device, while the wireless device in the first state, over the one or more resources, wherein the first state is a connected state and the second state is an inactive state or an idle state, wherein the inactive state is an intermediate state between the connected state and the idle state, wherein when the wireless device is in the inactive state, the wireless device access stratum (AS) context is kept both at the wireless device and the radio network node.

10. The method according to claim 9, wherein the indication is an uplink grant and comprises a validity time.

11. The method according to claim 9, further comprising, when no data is received from the wireless device within a time interval from the transmission of the release message, finalizing a state transition procedure for the wireless device.

12. The method according to claim 9, wherein a buffer status report is received within a time interval from transmitting the release message, the method further comprising transmitting an additional indication, indicating further one or more resources for uplink transmissions for the wireless device, based on the buffer status report.

13. The method according to claim 9, further comprising:
receiving, from the wireless device, a resume message or a request message to indicate a state transition for the wireless device to go back to the first state.

14. A radio network node for handling communication of a wireless device in a wireless communication network, wherein the radio network node comprises processing circuitry configured to:

determine to release the wireless device from a first state, wherein the wireless device is with an active connection for communicating data, to a second state;

transmit to the wireless device, a release message to suspend or release the wireless device from the first state to the second state, and along with the release message, an indication of one or more resources for uplink transmissions for the wireless device; and then receive an uplink transmission from the wireless device, while the wireless device is in the first state, over the one or more resources, wherein the first state is a connected state and the second state is an inactive state or an idle state, wherein the inactive state is an intermediate state between the connected state and the idle state, wherein when the wireless device is in the inactive state, the wireless device access stratum (AS) context is kept both at the wireless device and the radio network node.

15. The radio network node according to claim 14, wherein the indication is an uplink grant and comprises a validity time.

16. The radio network node according to claim 14, when no data is received from the wireless device from the transmission of the release message within a time interval, the radio network node is configured to finalize a state transition procedure for the wireless device.

17. The radio network node according to claim 14, wherein the radio network node is further configured to, when a buffer status report is received within a time interval from transmitting the release message, transmit an additional indication, indicating further one or more resources for uplink transmissions for the wireless device, based on the buffer status report.

18. The radio network node according to claim 14, wherein the radio network node is further configured to:
receive from the wireless device, a resume message or a request message to indicate a state transition for the wireless device to go back to the first state.

19. A wireless device for handling communication of the wireless device in a wireless communication network, wherein the wireless device is configured to operate in a first state wherein the wireless device is using an active connection for communicating data, the wireless device comprising processing circuitry configured to:

receive from a radio network node, a release message to suspend or release the wireless device from the first state to a second state; and along with the release message, an indication indicating one or more resources for uplink transmissions for the wireless device; and then perform an uplink transmission, while the wireless device is in the first state, taking the received indication into account, wherein the first state is a connected state and the second state is an inactive state or an idle state, wherein the inactive state is an intermediate state between the connected state and the idle state, wherein when the wireless device is in the inactive state, the wireless device access stratum (AS) context is kept both at the wireless device and the radio network node.

20. The wireless device according to claim 19, wherein the indication is an uplink grant and comprises a validity time.

21. The wireless device according to claim 19, wherein the wireless device is further configured to, when having more data to transmit than indicated by the indication, transmit to the radio network node, a buffer status report of the more data.

22. The wireless device according to claim 19, wherein the wireless device is further configured to:
comply with the release message and transit to the second state.

23. The wireless device according to claim 22, wherein the wireless device is further configured to:
initiate a state transition to go back to the first state.

24. The wireless device according to claim 23, wherein the wireless device is further configured to:
transmit, to the radio network node, a resume message or a request
message to indicate the state transition to go back to the first state.

25. A radio network node comprising processing circuitry configured to:
determine to release a wireless device from a first state, wherein the wireless device is with an active connection for communicating data, to a second state;

transmit to the wireless device, a release message to suspend or release the wireless device from the first state to the second state, and along with the release message, an indication of one or more resources for uplink transmissions for the wireless device; and then receive an uplink transmission from the wireless device, while the wireless device is in the first state, over the one or more resources, wherein the first state is a connected state and the second state is an inactive state or an idle state, wherein the inactive state is an intermediate state between the connected state and the idle state, wherein when the wireless device is in the inactive state, the wireless device access stratum (AS) context is kept both at the wireless device and the radio network node.

26. A wireless device comprising processing circuitry configured to:

receive from a radio network node, a release message to suspend or release the wireless device from a first state to a second state, in which first state the wireless device is configured to use an active connection for communicating data, and along with the release message, an indication indicating one or more resources for uplink transmissions for the wireless device; and then perform an uplink transmission, while the wireless device is in the first state, taking the received indication into account, wherein the first state is a connected state and the second state is an inactive state or an idle state, wherein the inactive state is an intermediate state between the connected state and the idle state, wherein when the wireless device is in the inactive state, the wireless device access stratum (AS) context is kept both at the wireless device and the radio network node.

* * * * *